Sept. 10, 1935.    W. TIMSON    2,014,154
WEIGHING APPARATUS
Filed Nov. 17, 1931
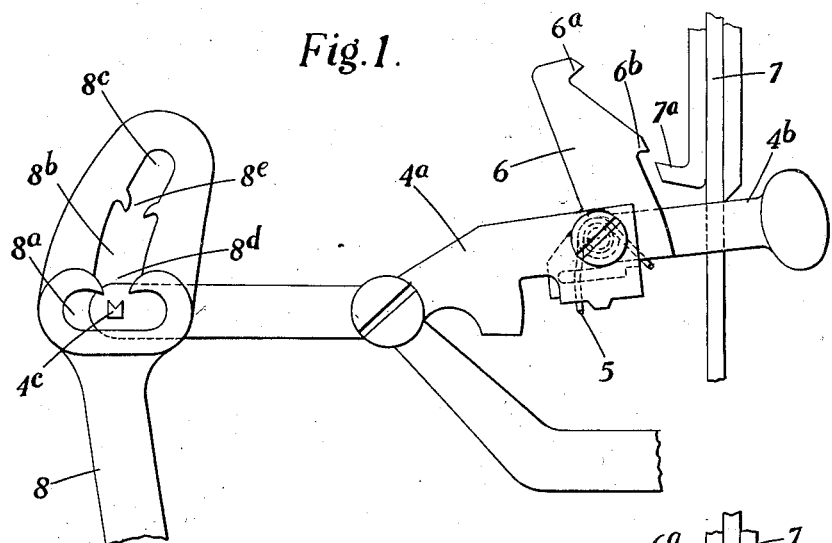
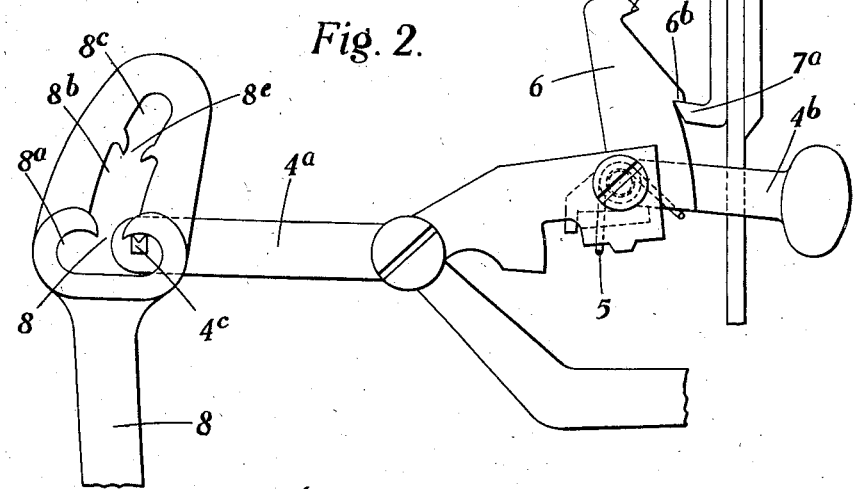
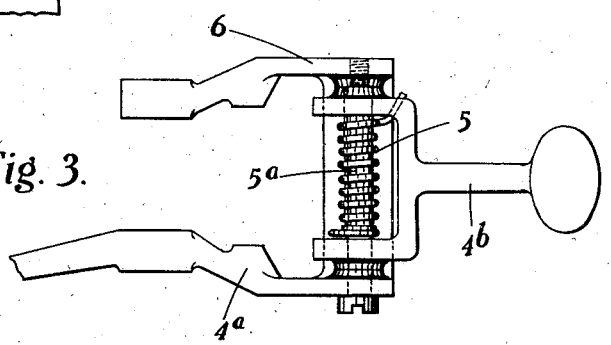
INVENTOR
William Timson
BY George E. Folkes.
ATTORNEY

Patented Sept. 10, 1935

2,014,154

UNITED STATES PATENT OFFICE

2,014,154

WEIGHING APPARATUS

William Timson, Birmingham, England, assignor to W. & T. Avery Limited, Birmingham, England Application November 17, 1931, Serial No. 575,564
In Great Britain December 31, 1930

2 Claims.  (Cl. 265—5)

This invention has reference to improvements in or relating to means for use in conjunction with the printing mechanism of weighing apparatus for preventing a printing operation being effected except when the apparatus is in equilibrium and is an improvement on or modification of the means for the said purpose described and claimed in the specification of my prior Patent No. 1,869,289.

In connection with the means described in my aforesaid patent specification there is a possibility of an endeavour being made to obtain a fraudulent record by manipulating the printing lever so as to hold the peg in the neck of the slot in the bell crank lever connected to the piston of the auxiliary dashpot prior to or during the progress of a weighing operation and then to actuate the lever to obtain a fraudulent record before the weighing mechanism has come to rest.

The present invention has for its object to render the possibility of such a fraudulent manipulation of the printing lever substantially impossible.

The invention consists of an improved or modified means for use in conjunction with the printing mechanism of a weighing apparatus for preventing a printing operation being effected except when the apparatus is in equilibrium described in the specification of No. 1,869,289 and comprises the provision of an additional check or checks which necessitate the projection on the printing lever being in absolute register with its path of permitted motion with the weighing mechanism in equilibrium before the printing lever can be actuated so as to effect a printing operation.

The invention will now be described with particular reference to the accompanying sheet of drawing, wherein:

Figure 1 represents, somewhat diagrammatically in side elevation, sufficient of the printing mechanism as is necessary to an understanding of the invention the parts being shown in the positions occupied when the weighing apparatus is in equilibrium and when it is possible to obtain a printed record.

Figure 2 is a similar view to Figure 1 but showing the parts in the positions occupied when the weighing apparatus is out of equilibrium and illustrating the method of eliminating a straining of the mechanism in the event of an attempt being made to operate the printing lever when the mechanism is out of equilibrium, and Figure 3 is a detail view illustrating the two-part construction of the printing lever.

In the drawing like numerals of reference indicate similar parts in the several views.

According to the invention the printing lever is formed in two parts, $4^a$, $4^b$ which have a broken link connection with one another the two parts of the lever being maintained normally in alignment by means of a "rat-trap" spring 5. The two parts $4^a$, $4^b$ of the printing lever are joined by a spindle $5^a$ which permits a rocking movement of the part $4^b$ relatively to the part $4^a$. The part $4^b$ of the printing lever which is mounted on the spindle $5^a$ is jawed and the spring 5 is located between the jaws and concentrically wound about the said spindle. Fixed to the outermost part $4^b$ of the printing lever is an upstanding plate 6 which is provided with a substantially quadrantal surface having a pair of teeth $6^a$, $6^b$ which are adapted to co-operate with a projection $7^a$ fixed to the casing 7 containing the printing mechanism. The inner part $4^a$ of the printing lever carries a peg $4^c$ which works in the slotted portion of the bell crank lever 8 referred to in our aforesaid Patent No. 1,869,289. The slotted portion of the bell crank lever 8 is divided into three sections $8^a$, $8^b$, $8^c$, the lowermost $8^a$ of which is wide enough to permit of the unrestricted oscillation of the lever 8 relatively to the peg $4^c$ in the initial stages of a weighing operation. The aforesaid lowermost slotted section communicates by way of a neck $8^d$ with an intermediate slotted section $8^b$ which is sufficiently wide to allow of a limited degree of oscillation of the bell crank lever 8 relatively to the peg $4^c$ when the peg $4^c$ is engaged therein. The intermediate slotted section $8^b$ in turn communicates with an upper slotted section $8^c$ by way of a neck $8^e$ the necks in the slotted sections being arranged on the radial path necessary to be taken by the peg $4^c$ when a printing operation is being effected. The position of the neck $8^e$ is such that as the peg $4^c$ enters the said neck the known gripping means (not shown) for holding the chart against rotation in readiness for a printing operation come into action.

The operation of the invention is as follows:—

In the event of a normal attempt being made to obtain a printing record before the weighing apparatus has attained equilibrium the peg $4^c$ engages below the bounding walls of the slot $8^a$ in the lowermost slotted section on either side of the neck $8^d$ and is prevented from passing through the said neck. Should undue pressure be applied to the printing lever when such an operation is attempted the lever breaks at the joint and permits the outermost or actuating part 4$^b$ to be depressed thereby bringing the lower tooth 6$^b$ on the quadrantal plate 6 into contact with the stop 7$^a$ thus preventing the transmission of violent forces to the bell crank lever 8. If an attempt be made to obtain a fraudulent record by first engaging the peg 4$^c$ within the lowermost neck 8$^d$ or within the intermediate slotted section 8$^b$ the peg 4$^c$ cannot pass through the uppermost neck 8$^e$ until equilibrium has been attained, as it is restrained by the walls of the slot on either side of the entrance to the upper neck 8$^e$ and should a violent movement be applied to the printing lever for effecting such an operation the printing lever breaks at the joint and brings the uppermost tooth 6$^a$ into engagement with the stop 7$^a$. In the event of an attempt being made to locate the peg in the uppermost neck 8$^e$ before a weighing operation is completed the positioning of the peg 4$^c$ in the said neck 8$^e$ entails the gripping means for restraining the chart against rotation during a printing operation coming into action to grip the said chart and thus to prevent an obvious fraudulent record being obtained.

It has been found by repeated experiment that the additions or modifications herein set out to the mechanism claimed and described in my prior patent specification substantially eliminates all possibility of the fraudulent manipulation of the printing lever and thus ensures that a correct record of the weight of an article being weighed shall be obtained.

I claim:—

1. A means for use in conjunction with the printing mechanism of weighing apparatus for preventing a printing operation being effected except when the apparatus is in equilibrium comprising a two-part printing lever having a broken link connection between the two parts, a fixed member, means carried by one part of the printing lever adapted to come into locking engagement with the fixed member in the event of the breaking of the link connection thereby preventing transmission of shock to and through the other part of the said printing lever, a lever susceptible to movements of the weighing mechanism, a plurality of checking means embodied in said lever, a member carried by one of the parts of the printing lever and adapted to cooperate with the said checking means the relationship between the said member and the checking means being such that checking means must be passed by the said member before a printing operation can be effected.

2. A means for use in conjunction with the printing mechanism of weighing apparatus for preventing a printing operation being effected except when the apparatus is in equilibrium, according to claim 1, wherein a spring is provided for maintaining the two parts of the printing lever in operative connection for effecting a printing operation under proper conditions.

WILLIAM TIMSON.